(12) United States Patent
Walsh et al.

(10) Patent No.: US 9,300,690 B2
(45) Date of Patent: Mar. 29, 2016

(54) SECURE NETWORK LABELING TO CONTROL INTER-PROCESS COMMUNICATIONS IN A MULTI-TENANT PLATFORM-AS-A-SERVICE (PAAS) SYSTEM

(71) Applicant: Red Hat, Inc., Raleigh, NC (US)

(72) Inventors: Daniel Walsh, Marlborough, MA (US); Paul Moore, Manchester, NH (US)

(73) Assignee: Red Hat, Inc., Raleigh, NC (US)

( * ) Notice: Subject to any disclaimer, the term of this patent is extended or adjusted under 35 U.S.C. 154(b) by 122 days.

(21) Appl. No.: 13/934,907

(22) Filed: Jul. 3, 2013

(65) Prior Publication Data

US 2015/0012962 A1    Jan. 8, 2015

(51) Int. Cl.
*H04L 29/00* (2006.01)
*H04L 29/06* (2006.01)

(52) U.S. Cl.
CPC .............. *H04L 63/20* (2013.01); *H04L 63/105* (2013.01)

(58) Field of Classification Search
CPC ....................................................... H04L 63/20
See application file for complete search history.

(56) References Cited

U.S. PATENT DOCUMENTS

| | | | |
|---|---|---|---|
| 8,271,653 | B2 | 9/2012 | DeHaan |
| 2003/0110372 | A1* | 6/2003 | Proudler ........................ 713/150 |
| 2007/0288247 | A1* | 12/2007 | MacKay ........................... 705/1 |
| 2012/0102486 | A1 | 4/2012 | Yendluri |
| 2012/0324069 | A1 | 12/2012 | Nori et al. |
| 2013/0036470 | A1 | 2/2013 | Zhu et al. |
| 2013/0263209 | A1* | 10/2013 | Panuganty ........................ 726/1 |
| 2014/0365527 | A1* | 12/2014 | Fuchs et al. ................... 707/786 |

FOREIGN PATENT DOCUMENTS

WO        2012028957          3/2012

OTHER PUBLICATIONS

Mark Atwood, "Deploying a Scalable Multi-Node PaaS with OpenShift Origin", https://openshift.redhat.com/community/blogs/deploying-a-scalable-multi-node-paas-with-openshift-origin, Jun. 26, 2012, 3 pages.
Mark Greene and Vineet Joshi, "Designing Portable Applications With Cloud Foundry", http://blog.doudfoundry.org/2012/12/13/designing-portable-applications-with-cloud-foundry/, Dec. 13, 2012, 4 pages.
Steen Citron-Pousty, "Build a PaaS with OpenShift Origin", http://www.slideshare.net/scitronpousty/build-your-own-paas-using-openshift-origin, Feb. 24, 2013, 30 pages.

* cited by examiner

*Primary Examiner* — Brandon Hoffman
*Assistant Examiner* — Helai Salehi
(74) *Attorney, Agent, or Firm* — Lowenstein Sandler LLP

(57) ABSTRACT

Implementations for secure network labeling to control inter-process communications in a multi-tenant Platform-as-a-Service (PaaS) system are disclosed. A method of the disclosure includes initializing, by a processing device of a node, a gear of an application on the node, wherein the node hosts a plurality of gears for a plurality of applications of a multi-tenant Platform-as-a-Service (PaaS) system, and wherein the plurality of applications comprising multi-tenant applications having different owners. The method further includes determining a user identifier (UID) of the gear, generating a custom network security label (NSL) of the gear, assigning the custom NSL to the gear, and applying the custom NSL to an outgoing network packet sent from the gear to another gear within the PaaS system.

20 Claims, 6 Drawing Sheets

500

Receive, at a node of a PaaS system, incoming network packet directed to gear of a multi-tenant application running on the node
510

Parse received incoming network packet to determine first custom NSL for the network packet
520

Determine second custom NSL of the gear to which the network packet is addressed on the node
530

Security policy allow 2$^{nd}$ custom NSL to receive network packets labeled with 1$^{st}$ custom NSL?
540

YES → Allow communication of the network packet to the destination gear
550

NO → Block and/or deny sending of the packet to the destination gear
560

*Figure 5* under US 9,300,690 B2

SECURE NETWORK LABELING TO CONTROL INTER-PROCESS COMMUNICATIONS IN A MULTI-TENANT PLATFORM-AS-A-SERVICE (PAAS) SYSTEM

TECHNICAL FIELD

The implementations of the disclosure relate generally to platform-as-a-service (PaaS) environments and, more specifically, relate to secure network labeling to control inter-process communications in a multi-tenant PaaS system.

BACKGROUND

Currently, a variety of Platform-as-a-Service (PaaS) offerings exist that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware, software, and provisioning hosting capabilities, providing the facilities to support the complete life cycle of building, delivering, and servicing web applications are entirely available from the Internet. Typically, these facilities operate as one or more virtual machines (VMs) running on top of a hypervisor in a host server. One of the goals of a PaaS offering is to provide the user as close to the same level of security that the user would get when running applications on machines that the user controlled.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 5 illustrating a method for control inter-process communication of applications running on nodes of a multi-tenant using custom NSLs, according to an implementation of the disclosure.

DETAILED DESCRIPTION

Implementations of the disclosure provide for secure network labeling to control inter-process communications in a multi-tenant Platform-as-a-Service (PaaS) system. Deployment of multiple applications of multiple users on a single node (virtual machine (VM)) is a cost-efficient solution for PaaS providers. However, deploying a multi-tenant PaaS solution also raises a variety of concerns, one of which includes security. Specifically, security concerns exist in terms of separating multi-tenant applications from accessing each other within a node, as well as between nodes.

Some security solutions for PaaS systems provide that PaaS application instances, called gears, are separated using label-based Mandatory Access Control (MAC) and uniquely assigned security labels within a node. As a result, any gear is blocked from communicating with any other gear on the local node by the MAC security policy. A semi-random, yet unique, security label may be selected for each one of the gears and its content, with a security policy defined in such a way that blocks information flow between different gears on the system based on tenant agreements. If any gear tries to communicate with another gear with a different security label on the same node, the MAC prevents the communication.

However, such security solutions do not protect from inter-process (e.g., gear) communication between nodes of the PaaS system. Furthermore, standard procedures, such as traditional firewalls are not ideal, or capable of providing separation between processes. For instance, firewalls typically do not have access to security label information to enforce the MAC security policy. In addition, relying on each of the individual multi-tenant applications to implement and enforce such inter-process protection can be problematic and does not provide the same level of protection (e.g., uniformity) to the applications.

Implementations of the disclosure provide for an additional level of security for PaaS multi-tenant applications by using network security labels (NSLs) to control inter-process communication between nodes in a PaaS system. In particular, MAC-based security labeling can be extended over a network by assigning NSLs to network packets sent between nodes. Implementations may then enforce security policies on network traffic such that gears of a first application from a first node are able to communicate with gears of the first application on a second node, while all other application gears from the first node would be blocked from communicating with the gears of the first application on the second node.

Figure 1:
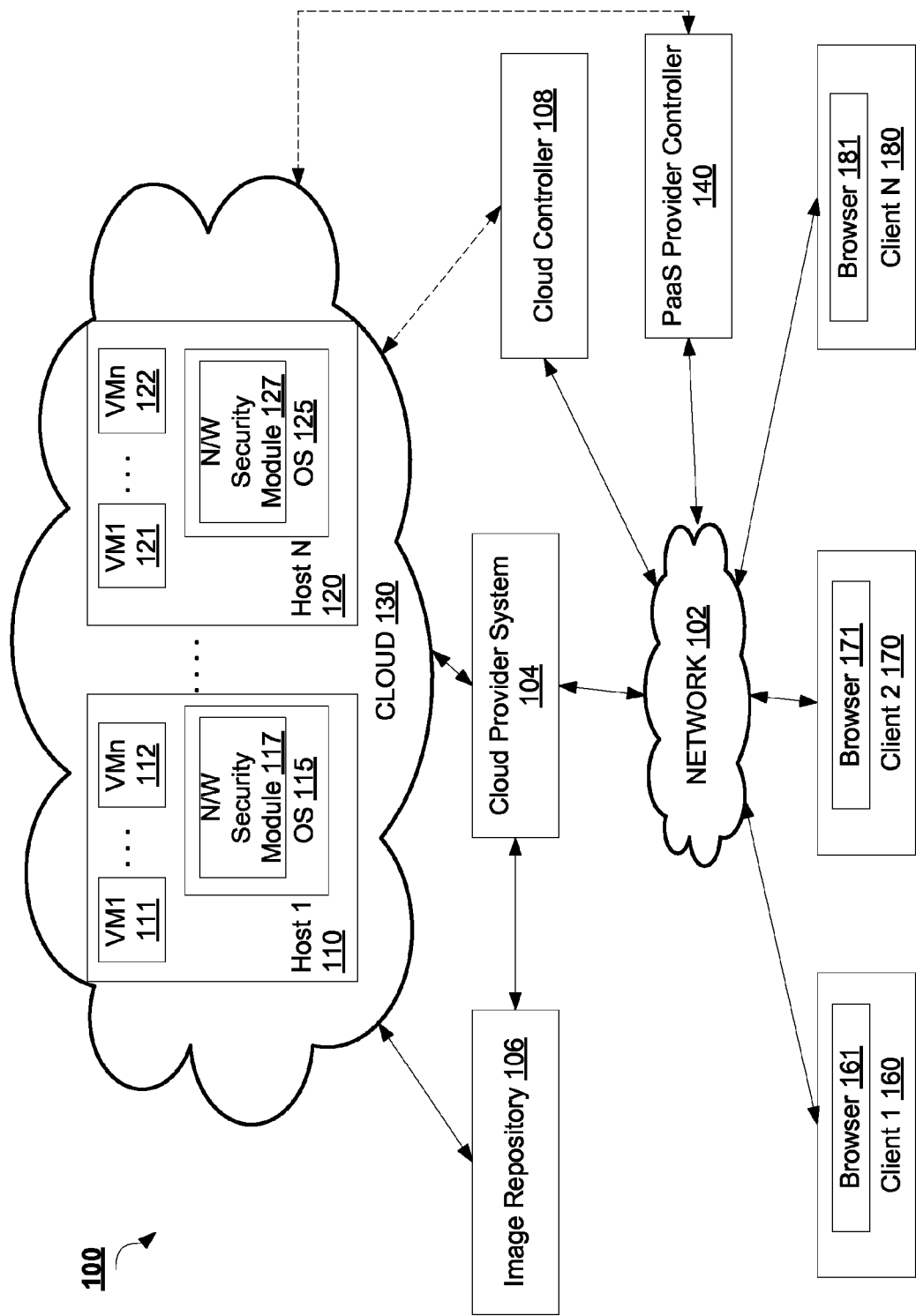
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes to execute software and/or other processes. In some implementations, these nodes are virtual machines (VMs), such as VMs 111, 112, 121, and 122 hosted in cloud 130. Each VM 111, 112, 121, 122 is hosted on a physical machine, such as host 1 110 through host N 120, configured as part of the cloud 130. In some implementations, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181.

Clients 160, 170 and 180 are connected to hosts 110, 120 on cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS provider controller 140. Based on these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data provides applications for a multi-tenant PaaS system managed by the PaaS provider controller 140.

In one implementation, each host machine 110, 120 providing VMs 111, 112, 121, 122 running applications for the PaaS provider controller 140 includes an operating system (OS) 115, 125. Each OS may include a network security module 117, 127 to apply network labeling to network packets communicated between VMs 111, 112, 121, 122. The network labeling provided by network security modules 117, 127 is used as part of a security policy applied to multi-tenant applications running on the VMs 111, 112, 121, 122 providing the multi-tenant PaaS system. In particular, the security policy applied to the network labels on packets sent between VMs 111, 112, 121, 122 maintains a separation between applications on the VMs 111, 112, 121, 122 for security purposes, such that a portion of a first application running on a first node (e.g., VM) may only communicate with another portion of that first application running on a second node (e.g., VM), and not portions of other applications running on the second node (e.g., VM). Further details of the networking labeling for security in a PaaS systems are described below with respect to FIGS. 2 and 3.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
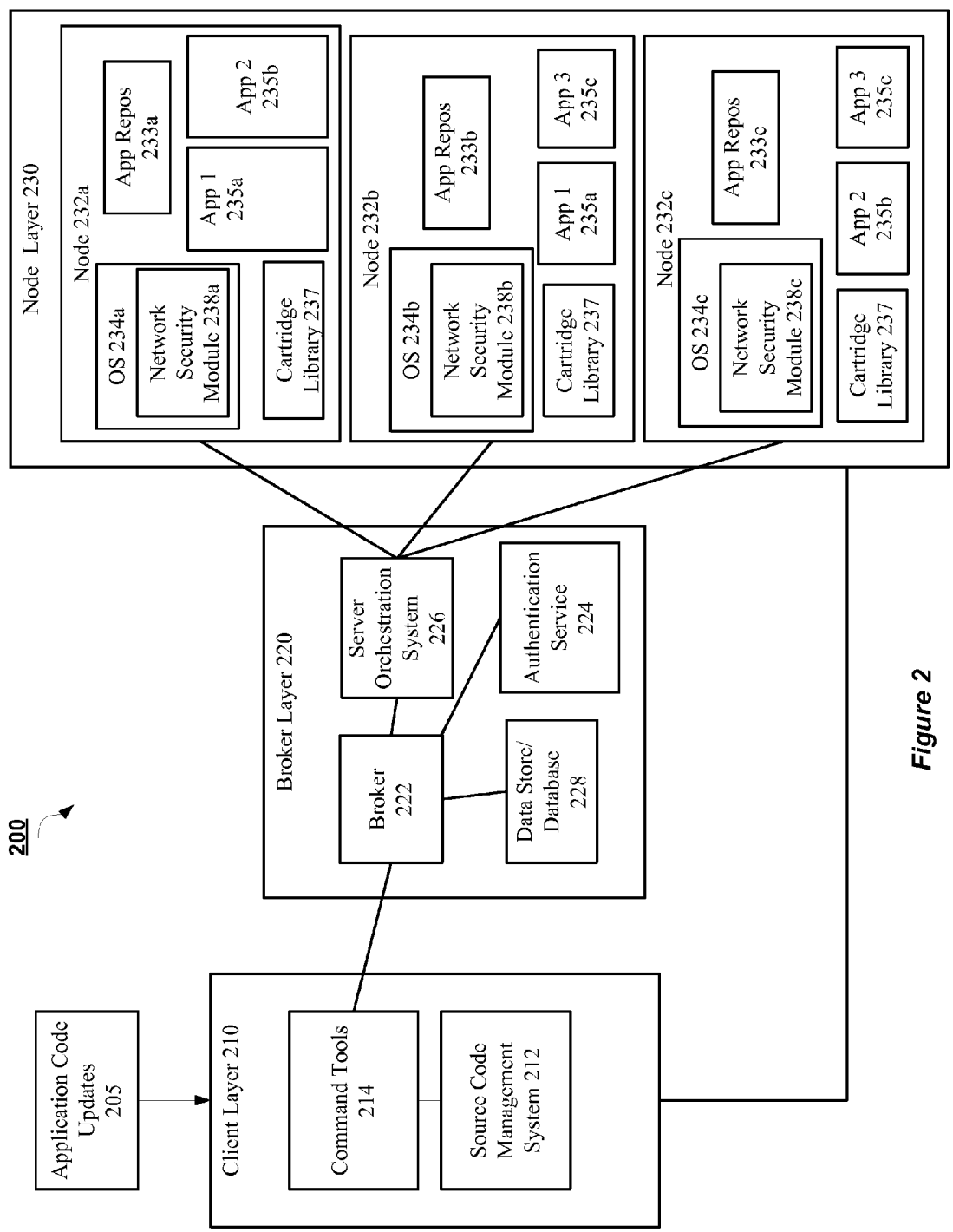
FIG. 2 is a block diagram of a PaaS system architecture according to an implementation of the disclosure.

FIG. 2 is a block diagram of a PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a broker layer 220, and a node layer 230.

In one implementation, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes for each application associated with the end user of the PaaS system 200. The packaged software application can then be "pushed" from the local SCM repository to a remote SCM repository, such as app repost 233a, 233B, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command tools 214 that a user can utilize to create, launch, and manage applications. In one implementation, the command tools 214 can be downloaded and installed on the user's client machine, and can be accessed via a command line interface or a graphical user interface, or some other type of interface. In one implementation, the command tools 214 expose an application programming interface ("API") of the broker layer 220 and perform other applications management tasks in an automated fashion using other interfaces, as will be described in more detail further below in accordance with some implementations.

In one implementation, the broker layer 220 acts as middleware between the client layer 210 and the node layer 230. The node layer 230 includes the nodes 232a-c on which software applications 235a-c are provisioned and executed. In one implementation, each node 232a-c is a VM provisioned by an Infrastructure as a Service (IaaS) provider. In other implementations, the nodes 232a-c may be physical machines (e.g., bare metal) or VMs residing on a single physical machine and running gears (discussed below) that provide functionality of applications of a multi-tenant PaaS system. In one implementation, the broker layer 220 is implemented on one or more machines, such as server computers, desktop computers, etc. In some implementations, the broker layer 220 may be implemented on one or more machines separate from machines implementing each of the client layer 210 and the node layer 230, or may implemented together with the client layer 210 and/or the node layer 230 on one or more machines, or some combination of the above.

In one implementation, the broker layer 220 includes a broker 222 that coordinates requests from the client layer 210 with actions to be performed at the node layer 230. One such request is new application creation. In one implementation, when a user, using the command tools 214 at client layer 210, requests the creation of a new application 235a-c, or some other action to manage the application 235a-c, the broker 222 first authenticates the user using an authentication service 224. In one implementation, the authentication service may comprise custom authentication methods, or standard protocols such as SAML, OAuth, etc. Once the user has been authenticated and allowed access to the system by authentication service 224, the broker 222 uses a server orchestration system 226 to collect information and configuration information about the nodes 232a-c.

In one implementation, the broker 222 uses the Marionette Collective™ ("MCollective™") framework available from Puppet Labs™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the broker 222 manages the business logic and model representing the nodes 232a-c and the applications 235a-c residing on the nodes, and acts as a controller that generates the actions requested by users via an API of the client tools 214. The server orchestration system 226 then takes the actions generated by the broker 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud based storage service provided by a Storage-as-a-Service (SaaS) provider, such as Amazon™ S3™ (Simple Storage Service). The broker 222 uses the information about the nodes 232a-c and their applications 235a-c to model the application hosting service and to maintain records about the nodes. In one implementation, data of a node 232a-c is stored in the form of a JavaScript Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some implementations, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple software components (referred to herein as cartridges) that may be utilized by applications 235a-c deployed on node 232a-c. A cartridge can represent a form of support software (or middleware) providing the functionality, such as configuration templates, scripts, dependencies, to run an application 235a-c and/or add a feature to an application, 235a-c. In one implementation, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance of a cartridge from cartridge library 237 to an application 235a-c provides a capability for the application 235a-c, without the customer who owns the application having to administer or update the included capability.

Implementations of the disclosure provide for security between multi-tenant applications 235a-c hosted on nodes 232a-232c by assigning a custom network security label (NSL) to network packets sent between nodes 232a-232c. This custom NSL is unique to each application 235a-c instance of the PaaS system 200, and allows each node 232a-c to prevent communications between different applications 235a-c on different nodes 232a-c. Each node 232a-c may include an OS 234a-c that implements a secure network labeling feature to apply to applications 235a-c running on the node 232a-c. The OS 234a-c may include a network security module 238a-c that provides custom NSLs for each application 235a-c on the node 232a-c, and applies a security policy using the custom NSLs in order to protect applications 235a-c from unauthorized communications. One embodiment of the interaction between nodes 232a-c to implement secure networking labeling to control inter-process communications in a multi-tenant PaaS system is now described in more detail with reference to FIG. 3.

Figure 3:
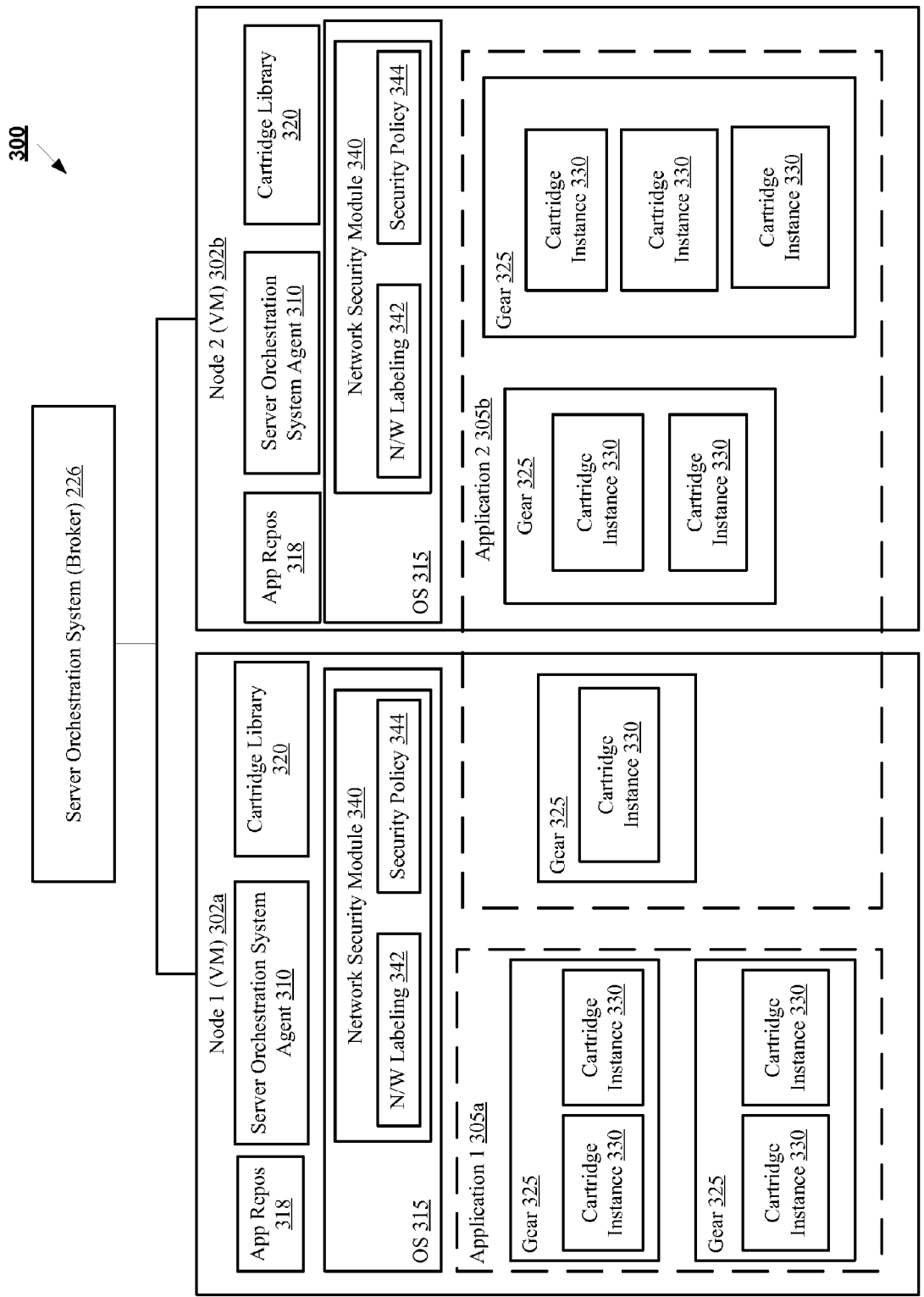
FIG. 3 is a block diagram of depicting a communication infrastructure between a server orchestration system and a plurality of nodes according to implementations of the disclosure.

FIG. 3 is a block diagram depicting a communication infrastructure 300 between a server orchestration system 226 and a plurality of nodes 302a-b according to implementations of the disclosure. In one implementation, server orchestration system 226 and nodes 302a-b are the same as their counterparts described with respect to FIG. 2. In one implementation, each node 302a-b is implemented as a VM and has an operating system 315 that can execute applications 305a-b using the app repos 318 and cartridge library 320 that are resident on the nodes 302a-b. In one implementation, applications 305a-b are the same as applications 235a-c described with respect to FIG. 2.

Each node 302a-b also includes a server orchestration system agent 310 configured to track and collect information about the node 232 and to perform management actions on the node 232. Thus, in one implementation, using MCollective™ as the server orchestration system 226, the server orchestration system agent 310 can act as a MCollective™ server. The server orchestration system 226 would then act as the MCollective™ client that can send requests, queries, and commands to the MCollective™ server on node 302a-b.

As previously mentioned, cartridges provide the underlying support software that implements the functionality of applications 305a-b. In one implementation, an application 305a-b may utilize one or more cartridge instances 330 that are run in one or more resource-constrained gears 325 on nodes 302a-b. Cartridge library 320 provides an OS 315-based location, outside of all application gears 325, that acts as a source for cartridge instantiations 330 that provide functionality for an application 305a-b. An application 305a-b may use more than one cartridge instance 330 as part of providing functionality for the application 305a-b. One example of this is a JavaEE application that uses a JBoss™ AS7 cartridge with a supporting MySQL™ database provided by a MySQL™ cartridge. Each cartridge instance may include a software repository that provides the particular functionality of the cartridge instance 330.

A gear 325 is a resource-constrained process space on the node 302a-b to execute functionality of an application. In some implementations, a gear 325 is established by the node 302a-b with resource boundaries, including a limit and/or designation of the amount of memory, amount of storage, and security types and/or labels to be applied to any functions executed by the gear 325. In one implementation, gears 325 may be established using the Linux Containers (LXC) virtualization method. In further implementations, gears 325 may also be established using cgroups, SELinux™, and kernel namespaces, to name a few examples.

In some implementations, cartridges instances 330 for an application 305*a-b* may execute in gears 325 dispersed over more than one node 302*a-b*, as shown with application 2 305*b* illustrated in FIG. 3. In other implementations, cartridge instances 330 for an application 305*a-b* may run in one or more gears 325 on the same node 302*a-b*, as shown with application 1 305*a* on node 1 302*a* in FIG. 3.

In one implementation, OS 315 includes a network security module 340 that applies secure network labeling and policy enforcement to multi-tenant applications 305*a-b* that run on the node 302*a-b*. Network security module 340 includes a network labeling component 342 and a security policy component 344. The network labeling component 342 generates custom NSLs for each application 305*a-b* running on the node 302*a-b*. The security policy component 344 applies network labeling security policies associated with the custom NSLs to the applications 305*a-b* and their associated network traffic. Generally speaking, the custom NSL is a security enhancement to an OS, such as OS 315, that allows administrators to label network packets with the security labels. These NSLs may then be used to constrain communication of the packet and processes (i.e., applications 305*a-b*) trying to access the packet.

The network labeling component 342 may generate custom (e.g., unique) NSLs to associate with each application instance running on the node 302*a-b*. The custom NSL may be implemented using a Multi-Category Security (MCS) feature of SELinux™ SELinux™ is an OS-based feature that provides a flexible Mandatory Access Control (MAC) system.

The NSL may be a customization of the SELinux™ security context type. A security context in SELinux™ is a state given to a resource that uniquely identifies the permissions that are applicable to the resource. When a resource has no security context assigned to it, SELinux™ gives the resource a default security context, which generally has little permissions to perform any actions. The security context may be displayed using three to four definitions, depending on the type of policy being run by SELinux™. The definitions may include a user, a role, a type, and a range of sensitivity levels and categories. In some implementations, other security category labeling features from other OS vendors may be utilized.

Network labeling component 342 may generate custom NSLs based on, at least partially, a unique user ID (UID) of the application 305*a-b*. OS 315 maintains a set of unique UIDs that are assigned to applications 305*a-b* as they are installed on the node 302*a-b*. In particular, each gear 325 of an application 305*a* is assigned the UID of the application 305*a-b*. In one implementation, network labeling component 342 generates the custom NSL for an application 305*a-b* (i.e., the gears 325 of the application 305*a-b*) by applying a transform to the unique local UID of the application. In some implementations, a SELinux™ label that is already associated with the application 305*a-b* is used to generate the custom NSL for the application 305*a-b*.

Because each application's 305*a-b* UID is the same across nodes 302*a-b*, the custom NSL of an application 305*a-b* is also the same across nodes 302*a-b*. Thus, the gears 325 of application 2 305*b* running on node 1 302*a* have the same UID as the gears of application 2 305*b* running on node 2 302*b*. Accordingly, all gears 325 of application 2 305*b* have the same UID, and therefore the same custom NSL, no matter which node 302*a-b* they are running on. The mapping of UID to NSL may be stored by the network labeling component 342, for example, in a data store (not shown) of the node 302*a-b*. In other implementations, the mapping of UID to NSL may be performed on-demand without storing the mapping. In some embodiments, when the NSL is based on the SELinux™ security label, the mapping of UID to NSL is not performed for purposes of generating the NSL.

After the custom NSLs are generated and mapped to their associated UIDs, the networking labeling component 342 applies the custom NSL to any network traffic (i.e., network data packet) sent from gear 325 of an application 305*a-b* to another node 302*a-b*. In one embodiment, the network labeling component 342 applies the custom NSL as part of a header of an outgoing packet from a gear 325. In one implementation, the custom NSL is part of a Commercial Internet Protocol Security Option (CIPSO) label of the outgoing packet. The CIPSO label is based on a labeling standard that defines an Internet Protocol (IP) security option that can be used to pass security information within and between computer systems. The CIPSO protocol supports a large number of security domains. Implementation of the disclosure may also support and implement security labeling protocols other than CIPSO, as well. For example, the Calipso labeling protocol or the IPsec labeling protocol may be utilized.

When a node 302*a-b* receives network traffic, the packet, including the header information, is parsed to determine the custom NSL associated with the packet. The security policy component 344 may then use this custom NSL to apply security policies to the communication of the packet with respect to the destination gear 325 of the receiving node 302*a-b*. More specifically, the security policy component 344 determines whether the custom NSL associated with the destination gear 325 of the packet is allowed to accept incoming network traffic having a a custom NSL of the received packet. If the security policy does not allow the interaction, then the security policy component 344 blocks/denies communication of the packet to the destination. If the security policy does allow the interaction, then the security policy component 344 allows the communication of the packet to its destination gear 325.

As a result, gears 325 of the same application that are spread among multiple nodes 302*a-b* can communicate with each other without being exposed to unwanted communications. For example, gears 325 of application 2 305*b* running on node 2 302*b* can receive communications from gears 325 of application 2 305*b* running on node 1 302*a*, but cannot receive communications from gears 325 of application 1 305*a* running on node 1 302*a*.

Figure 4:
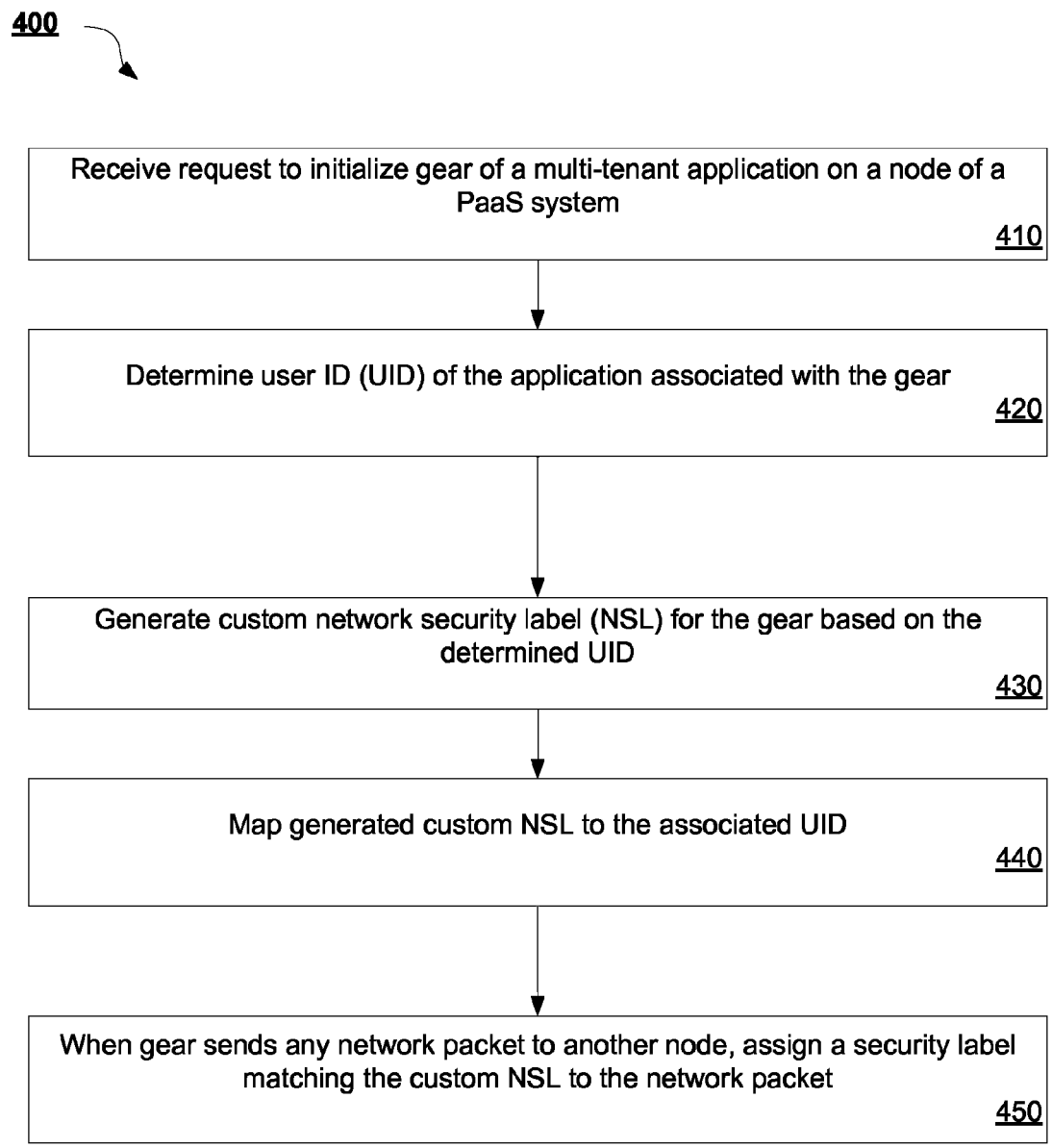
FIG. 4 illustrating a method for applying custom network security labels (NSLs) to applications running on nodes of a multi-tenant PaaS system according to an implementation of the disclosure.

FIG. 4 is a flow diagram illustrating a method 400 for applying custom NSLs to applications running on nodes of a multi-tenant PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by security network module 340 described with respect to FIG. 3.

Method 400 begins at block 410, where a request to initialize a gear of a multi-tenant application on a node of a PaaS system is received. In one embodiment, the request is received at a server orchestration system agent of the node and includes a UID of the multi-tenant application. At block 420, a UID of the application associated with the gear is determined. As previously mentioned, this UID may be part of the request to initialize the gear. In another implementation, the node may request this information from a server orchestration system of the PaaS system.

At block 430, a custom NSL for the gear is generated based on the determined UID. In one implementation, a transform is applied to the UID to generate the custom NSL. The transform may be a transform that is universally applied to UID across the PaaS system to generate custom NSLs for gears. In other implementations, the custom NSL is based on a SELinux™ security label that is already associated with the application. In this case, the SELinux™ security label is determined based on the UID and utilized to generate (e.g, copy, or apply some other function to the SELinux™ security label) the custom NSL. Then, at block 440, the generated custom NSL is mapped to the UID of the gear. In one implementation, the mapping is maintained in the data store of the node. In other implementations, the mapping is not stored and block 440 may be skipped.

Lastly, at block 450, when the gear sends any network packets to another node of the PaaS system, the outgoing network packet is assigned a security label using the custom NSL. In one implementation, the custom NSL is part of a security label in a header of the packet. For example, the security label may be a CIPSO label. The custom NSL is added to any packets sent from the gear.

FIG. 5 is a flow diagram illustrating a method 500 for control inter-process communication of applications running on nodes of a multi-tenant using custom NSLs, according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by security network module 340 described with respect to FIG. 3.

Method 500 begins at block 510, where an incoming network packet is received at a node of the PaaS system. The network packet may be directed to a gear of a multi-tenant application running on the node. At block 520, the packet is parsed to determine a first custom NSL. In one implementation, the first custom NSL is part of a security label of the header, such as a CIPSO label.

At block 530, a second custom NSL that is associated with the destination gear of the node is determined. The second custom NSL may be determined by accessing a mapping of UIDs to custom NSLs maintained by the node. In one implementation, the UID of the destination gear may be part of the header information of the received packet. In another implementation, the SELinux™ security label of the receiving application is determined (e.g., looked up) and used as the second custom NSL.

At decision block 540, it is determined whether a security policy of the OS of the node allows applications associated with the second custom NSL to received network packets labeled with the first custom NSL. In some implementations, this first and second custom NSLs should match to satisfy the security policy. If so, the method 500 proceeds to block 550, where the communication of the network packet is allowed to continue on to the destination gear. On the other hand, if the first custom NSL and the second custom NSL do not match, then method 500 proceeds to block 560 where the sending of the packet to the destination gear is block and/or denied.

Figure 6:
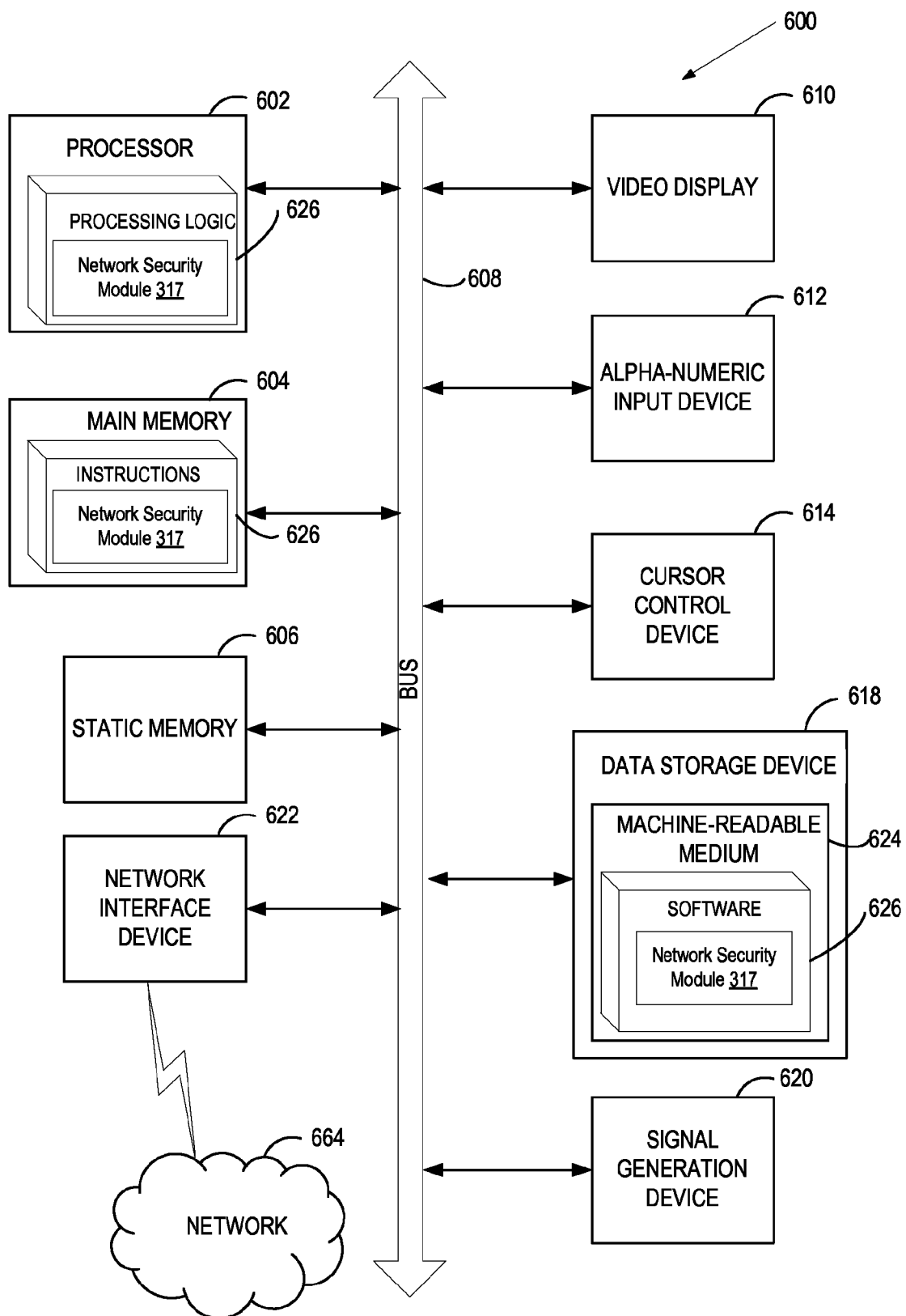
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 includes a processing device 602 (e.g., processor, CPU, etc.), a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement a network security module to provide secure network labeling to control inter-process communication in a multi-tenant PaaS system, such as the network security module 340 described with respect to FIG. 3, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
    initializing, by a processing device of a virtual machine (VM, a resource process space of an application on the VM, wherein the VM hosts a plurality of resource processes spaces for a plurality of applications of a multi-tenant Platform-as-a-Service (PaaS) system, and wherein the plurality of applications comprising multi-tenant applications having different owners;
    determining a user identifier (UID) of the resource process space;
    generating a first custom network security label (NSL) of the resource process space;
    assigning the first custom NSL to the resource process space;
    applying the first custom NSL to an outgoing network packet sent from the resource process space to another resource process space within the PaaS system;
    determining whether a security policy of the VM allows interactions between a second custom NSL of an incoming network packet addressed to the resource process space and the first custom NSL of the resource process space; and
    adjusting the interactions in view of the determined security policy.

2. The method of claim 1, wherein the generating the first custom NSL further comprising applying a transform to the UID, wherein the transform is universally applied by each VM of the PaaS system.

3. The method of claim 1, further comprising:
    receiving, from a different VM of the PaaS system, the incoming network packet addressed to the resource process space;
    parsing the incoming network packet to determine the second custom NSL associated with the incoming network packet; and
    determining the first custom NSL of the resource process space that the incoming network packet is addressed;
    wherein adjusting the interactions in view of the determined security policy further comprises:

when the security policy of the VM allows the interactions, allowing communication of the incoming network packet to proceed to the resource process space; and when the security policy does not allow the interactions, denying the communication of the incoming network packet to the resource process space.

4. The method of claim 1, wherein the resource process space is a gear.

5. The method of claim 1, wherein each of the custom NSLs are security labels of an operating system (OS) of the VM that utilizes SELinux™ operating system to provide Mandatory Access Control (MAC).

6. The method of claim 1, wherein the assigning the first custom NSL to the resource process space further comprises mapping the first custom NSL to the UID of the resource process space in a data store maintained by the PaaS system.

7. The method of claim 1, wherein applying the first custom NSL to the outgoing network packet further comprises incorporating the first custom NSL as part of a Commercial Internet Protocol Security Option (CIPSO) label of a header of the outgoing network packet.

8. The method of claim 3, wherein the security policy allows the interactions between the determined second custom NSL of the incoming network packet and the first custom NSL of the resource process space when the NSLs match.

9. A system, comprising:
a memory; and
a processing device communicably coupled to the memory, the processing device to:
initialize a resource process space of an application running in a virtual machine (VM) executed by the processing device from the memory, wherein the VM hosts a plurality of resource process spaces for a plurality of applications of a multi-tenant Platform-as-a-Service (PaaS) system, and wherein the plurality of applications comprising multi-tenant applications having different owners;
determine a user identifier (UID) of the resource process space;
generate a first custom network security label (NSL) of the resource process space;
assign the first custom NSL to the resource process space;
apply the first custom NSL to an outgoing network packet sent from the resource process space to another resource process space within the PaaS system;
determine whether a security policy of the VM allows interactions between a second custom NSL of an incoming network packet addressed to the resource process space and the first custom NSL of the resource process space; and
adjust the interactions in view of the determined security policy.

10. The system of claim 9, wherein the processing device to generate the first custom NSL further comprises the processing device to apply a transform to the UID, wherein the transform is universally applied by each VM of the PaaS system.

11. The system of claim 9, wherein the processing device further to:
receive, from a different VM of the PaaS system, the incoming network packet addressed to the resource process space;
parse the incoming network packet to determine the second custom NSL associated with the incoming network packet; and determine the first custom NSL of the resource process space that the incoming network packet is addressed;
wherein the processing device to adjust the interactions in view of the determined security policy further comprises the processing device to:
when the security policy of the VM allows the interactions, allow communication of the incoming network packet to proceed to the resource process space; and
when the security policy does not allow the interactions, deny the communication of the incoming network packet to the resource process space.

12. The system of claim 9, wherein the security policy allows the interactions between the determined second custom NSL of the incoming network packet and the first custom NSL of the resource process space when the NSLs match.

13. The system of claim 9, wherein each of the custom NSLs are security labels of an operating system (OS) of the VM that utilizes SELinux ™ operating system to provide Mandatory Access Control (MAC).

14. The system of claim 9, wherein the processing device to assign the first custom NSL to the resource process space further comprises the processing device to map the first custom NSL to the UID of the resource process space in a data store maintained by the PaaS system.

15. The system of claim 9, wherein the processing device to apply the first custom NSL to the outgoing network packet further comprises the processing device to incorporate the first custom NSL as part of a Commercial Internet Protocol Security Option (CIPSO) label of a header of the outgoing network packet.

16. A non-transitory machine-readable storage medium including instructions that, when accessed by a processing device, cause the processing device to:
receive, by the processing device of a virtual machine (VM), an incoming network packet directed to a resource process space executed by the VM, wherein the VM hosts a plurality of resource process spaces for a plurality of applications of a multi-tenant Platform-as-a-Service (PaaS) system, and wherein the plurality of applications comprising multi-tenant applications having different owners;
parse the incoming network packet to determine a first custom network security label (NSL) associated with the incoming network packet;
determine a second custom NSL associated with the resource process space to which the incoming network packet is directed;
determine whether a security policy of the VM allows interactions between the determined custom NSL of the incoming network packet and the custom NSL of the resource process space;
when the security policy allows the interactions, allow communication of the incoming network packet to proceed to the resource process space; and
when the security policy does not allow the interactions, deny the communication of the incoming network packet to the resource process space.

17. The non-transitory machine-readable storage medium of claim 16, wherein the security policy allows the interactions between the determined first custom NSL of the incoming network packet and the second custom NSL of the resource process space when the NSLs match.

18. The non-transitory machine-readable storage medium of claim 16, wherein the security labels are part of a security protocol of an operating system (OS) of the VM that utilizes SELinux™ operating system to provide Mandatory Access Control (MAC).

19. The non-transitory machine-readable storage medium of claim 16, wherein the first custom NSL is applied to a security label of a header of the incoming network packet when sent from another VM of the PaaS system that is running another resource process space associated with the first custom NSL.

20. The non-transitory machine-readable storage medium of claim 17, wherein the first and second NSLs are based on security labels applied to the associated applications, wherein the security labels are based on a user identifier (UID) of the applications.

* * * * *